US007281161B2

(12) United States Patent
Titmuss (10) Patent No.: US 7,281,161 B2
(45) Date of Patent: Oct. 9, 2007

(54) COMMUNICATIONS NETWORK WITH ANALYSIS OF DETECTED LINE FAULTS FOR DETERMINING NODES AS PROBABLE FAULT SOURCES

(75) Inventor: Richard Titmuss, Colchester (GB)

(73) Assignee: British Telecommunications public limited company, London (GB)

( * ) Notice: Subject to any disclaimer, the term of this patent is extended or adjusted under 35 U.S.C. 154(b) by 352 days.

(21) Appl. No.: 10/471,083

(22) PCT Filed: Mar. 12, 2002

(86) PCT No.: PCT/GB02/01123

§ 371 (c)(1),
(2), (4) Date: Sep. 8, 2003

(87) PCT Pub. No.: WO02/080505

PCT Pub. Date: Oct. 10, 2002

(65) Prior Publication Data

US 2004/0153855 A1 Aug. 5, 2004

(30) Foreign Application Priority Data

Mar. 28, 2001 (EP) .................................. 01302865

(51) Int. Cl.
*G06F 11/00* (2006.01)
*G06F 11/07* (2006.01)
(52) U.S. Cl. ................................. 714/26; 714/4; 714/33
(58) Field of Classification Search .................. None
See application file for complete search history.

(56) References Cited

U.S. PATENT DOCUMENTS 5,392,328 A 2/1995 Schmidt et al.
5,771,274 A 6/1998 Harris
5,819,028 A * 10/1998 Manghirmalani et al. ..... 714/57

(Continued)

FOREIGN PATENT DOCUMENTS

WO WO97/19544 5/1997

(Continued)

OTHER PUBLICATIONS

Communications Line http://www.yourwindow.to/information-security/gl_communicationsline.htm, unknown date.*

(Continued)

*Primary Examiner*—Scott Baderman
*Assistant Examiner*—Joseph Schell
(74) *Attorney, Agent, or Firm*—Nixon & Vanderhye P.C.

(57) ABSTRACT

A fault management system for an access network forms part of a communications network. In the access network, terminating lines in the form of pairs of wires extend from a local switch through a series of nodes to terminal equipment provided for user of the network. Each night, the system performs a series of tests on each of the lines. The results of the tests then analyzed with respect to a set of parameters to identify characteristics that would indicate that a fault is likely to occur on the associated circuit within a predetermined period e.g. 1 year. Further analysis is then carried out to establish a score which ranks each node in the network in terms of the urgency of any preventive maintenance required.

10 Claims, 7 Drawing Sheets

U.S. PATENT DOCUMENTS

| | | | |
|---|---|---|---|
| 6,125,458 | A | 9/2000 | Devan et al. |
| 6,128,753 | A | 10/2000 | Keeble et al. |
| 6,353,902 | B1 * | 3/2002 | Kulatunge et al. .......... 714/712 |
| 6,748,557 | B1 * | 6/2004 | Beardsley et al. ............ 714/43 |
| 7,043,661 | B2 * | 5/2006 | Valadarsky et al. ............ 714/4 |
| 2004/0168100 | A1 * | 8/2004 | Thottan et al. ................ 714/4 |

FOREIGN PATENT DOCUMENTS

| | | |
|---|---|---|
| WO | WO98/21869 | 5/1998 |

OTHER PUBLICATIONS

Development of Expert System for Operation at Substation by Kumano, Ito, Goda, Uekubo, Kyomoto, Kourogi, and Ariura published Jan. 1993, in IEEE Transactions on Power Delivery, vol. 8, Issue 1 pp. 56-65.*

Trigger et al, "New Technology for Reducing Operational Costs", BT Technol J., vol. 16, No. 4, Oct. 1998.

* cited by examiner

| | Cap A_E | Cap A_B | Cap A_B | Cap B_E_Prev | Dist | AB_Res | ABt_Res | AE_Res | BA_Res | BBT_Res | BE_Res | Term |
|---|---|---|---|---|---|---|---|---|---|---|---|---|
| Ln. 1 | 84 | 16 | 32 | 85 | 1400 | >1M ohm | >1M ohm | >1M ohm | >1M ohm | >1M ohm | >1M ohm | Bridge |
| Ln. 2 | 89 | 193 | 188 | 86 | 1432 | 22700 | >1M ohm | 350100 | 10100 | >1M ohm | 361656 | Bridge |
| Ln. 3 | 81 | 31 | 29 | 86 | 1348 | >1M ohm | >1M ohm | >1M ohm | >1M ohm | >1M ohm | >1M ohm | Bridge |
| Ln. 4 | 68 | 44 | 36 | 124 | 1132 | >1M ohm | >1M ohm | >1M ohm | >1M ohm | 392704 | 659456 | Bridge |
| Ln. 5 | 86 | 40 | 39 | 92 | 1432 | 247808 | >1M ohm | >1M ohm | >1M ohm | 390656 | >1M ohm | NoTerm |
| Ln. 6 | 88 | 622 | 666 | 83 | 1382 | >1M ohm | >1M ohm | >1M ohm | >1M ohm | >1M ohm | >1M ohm | NoTerm |
| Ln. 7 | 80 | 30 | 30 | 81 | 1334 | >1M ohm | >1M ohm | >1M ohm | >1M ohm | >1M ohm | >1M ohm | No Term |
| Ln. 8 | 89 | 700 | 694 | 83 | 1382 | >1M ohm | >1M ohm | >1M ohm | >1M ohm | 324958 | >1M ohm | No Term |
| Ln. 9 | 84 | 29 | 29 | 84 | 1400 | >1M ohm | >1M ohm | >1M ohm | >1M ohm | 265478 | >1M ohm | No Term |
| Ln. 10 | 84 | 16 | 32 | 85 | 1400 | >1M ohm | >1M ohm | >1M ohm | >1M ohm | 390656 | >1M ohm | Bridge |
| Ln. 11 | 89 | 193 | 188 | 86 | 1432 | 22700 | 350200 | >1M ohm | 10100 | 42528 | 361656 | Bridge |
| Ln. 12 | 81 | 31 | 29 | 86 | 1348 | >1M ohm | >1M ohm | >1M ohm | >1M ohm | >1M ohm | 659456 | Bridge |
| Ln. 13 | 68 | 44 | 36 | 124 | 1132 | >1M ohm | >1M ohm | >1M ohm | >1M ohm | >1M ohm | >1M ohm | NoTerm |
| Ln. 14 | 86 | 40 | 39 | 92 | 1432 | 247808 | >1M ohm | >1M ohm | >1M ohm | >1M ohm | >1M ohm | NoTerm |
| Ln. 15 | 88 | 622 | 666 | 83 | 1382 | >1M ohm | 390656 | >1M ohm | >1M ohm | >1M ohm | >1M ohm | No Term |
| Ln. 16 | 80 | 30 | 30 | 81 | 1334 | >1M ohm | >1M ohm | >1M ohm | >1M ohm | 123654 | >1M ohm | No Term |
| Ln. 17 | 89 | 700 | 694 | 83 | 1382 | >1M ohm | 3774685 | >1M ohm | >1M ohm | >1M ohm | >1M ohm | No Term |
| Ln. 18 | 84 | 29 | 29 | 84 | 1400 | >1M ohm | >1M ohm | >1M ohm | >1M ohm | >1M ohm | >1M ohm | Bridge |
| Ln. 19 | 84 | 16 | 32 | 85 | 1400 | >1M ohm | >1M ohm | >1M ohm | >1M ohm | 390656 | 361656 | Bridge |
| Ln. 20 | 89 | 193 | 188 | 86 | 1432 | 22700 | 350200 | 350100 | 10100 | 42528 | 659456 | Bridge |
| Ln. 21 | 81 | 31 | 29 | 86 | 1348 | >1M ohm | >1M ohm | >1M ohm | >1M ohm | >1M ohm | >1M ohm | NoTerm |
| Ln. 22 | 68 | 44 | 36 | 124 | 1132 | >1M ohm | >1M ohm | >1M ohm | >1M ohm | >1M ohm | >1M ohm | NoTerm |
| Ln. 23 | 86 | 40 | 39 | 92 | 1432 | 247808 | >1M ohm | >1M ohm | >1M ohm | 390656 | 659456 | No Term |
| Ln. 24 | 88 | 622 | 666 | 83 | 1382 | >1M ohm | >1M ohm | >1M ohm | >1M ohm | 265458 | >1M ohm | No Term |
| Ln. 25 | 80 | 30 | 30 | 81 | 1334 | >1M ohm | >1M ohm | >1M ohm | >1M ohm | >1M ohm | >1M ohm | No Term |
| Ln. 26 | 89 | 700 | 694 | 83 | 1382 | >1M ohm | >1M ohm | >1M ohm | >1M ohm | >1M ohm | >1M ohm | No Term |

COMMUNICATIONS NETWORK WITH ANALYSIS OF DETECTED LINE FAULTS FOR DETERMINING NODES AS PROBABLE FAULT SOURCES

This application is the US national phase of international application PCT/GB02/01123 filed 12 Mar. 2002 which designated the U.S.

RELATED APPLICATION AND PATENTS

This application may be related to the following copending commonly assigned application and/or patents:

a) U.S. Ser. No. 10/471,080 filed Sep. 8, 2003 naming Richard Maxwell as sole inventor entitled "FAULT MANAGEMENT SYSTEM FOR A COMMUNICATIONS NETWORK"

b) U.S. Pat. No. 6,125,458 B1 dated Sep. 26, 2000 naming Ian R. Devan, Andrew D. Chaskell as inventors and entitled "FAULT MANAGEMENT SYSTEM FOR A TELECOMMUNICATIONS NETWORK"

c) U.S. Pat. No. 6,128,753 dated Oct. 3, 2000 naming Peter J. Keeble, Andrew D. Chaskell & Robert D. Bailey as inventors and entitled "FAULT MANAGEMENT SYSTEM FOR A TELECOMMUNICATIONS NETWORK".

BACKGROUND

1. Technical Field

This invention relates to a fault management system for managing faults in the terminating circuits of a communications network and also to a method of operating such a fault management system.

2. Related Art

A conventional communications network comprises a relatively small number of interconnected main switches and a much larger number of local switches, each of which is connected to one or two of the main switches. The local switches are connected to the terminating circuits of the network and the far ends of these circuits are connected to terminal equipment such as telephone instruments provided for users of the network. The network formed from the main switches and local switches is known as the core network while a network formed from the terminating circuits is known variously as an access network or a local loop. In this specification, it will be referred to as an access network. Some terminating circuits are connected to a remote concentrator, which may or may not have switching capability. The remote concentrator is then connected to a local switch. In this specification, the term "local switch" is to be interpreted to cover both local switches and remote concentrators.

In a conventional access network, each terminating circuit is formed from a pair of copper wires. Typically, each pair of copper wires passes through a series of nodes (or network elements) between the local switch and terminal equipment. Examples of such nodes are primary cross-connect points, secondary cross-connect points, distribution points (DPs), cable nodes and joints.

Recently, optical fibres have been used to carry terminating circuits in access networks. In a modern access network, both pairs of copper wires and optical fibres are used to carry the terminating circuits. Where a terminating circuit is carried by an optical fibre, the circuit will typically pass through several node between the local switch and the terminal equipment. At each node, the incoming fibre from the local switch is split into a group of outgoing fibres which branch out in various directions. Where a terminating circuit is carried by an optical fibre from the local switch, the last part of the circuit may be carried by a pair of copper wire.

Unfortunately, terminating circuits are prone to faults. In the case of a terminating circuit carried by a pair of copper wires, example of such faults are disconnection, a short circuit between two wires of a pair of wires and a short circuit between one of the wires and earth. In the case of a conventional access network formed from pairs of wires, the causes of the faults include ingress of water into a node and also physical damage to a node.

When a customer reports a fault, the terminating circuit may be tested so as to identify the cause of the fault. The fault can then be repaired. However, until the fault is repaired, the user suffers a loss of service. It is known how to perform a set of circuit tests on each terminating circuit in an access network on a routine basis, for example nightly. Such routine tests can detect a fault on a terminating circuit. The fault can then be repaired, possibly before the user of the terminating circuit notices a loss of service. It is also known to measure the operational quality of individual nodes of an access network. Where the operational quality of a node is poor, it is likely that faults will develop in terminating circuits passing through the node. However, lines run though a number of nodes before terminating and so as a result, locating the node from which potential faults emanate is difficult and so efficient preventive maintenance is difficult.

BRIEF SUMMARY

According to an embodiment of the present invention there is provided a method of operating a fault management system for a communications network comprising a plurality of lines passing through a plurality of nodes, said method comprising the steps of:

performing a test on a plurality of said lines to obtain one or more elements of test data for each line;

analysing the test data to identify lines with common fault characteristics; establishing a score for each node based on the number of lines with common fault characteristics that provides a relative measure of the urgency of the maintenance tasks required to remove the fault characteristics from the node.

The priority score gives a relative measure for each node of the urgency and magnitude of the maintenance of a network node. This enables preventative maintenance to be targeted at the node most in need of it to avoid the worst consequences.

BRIEF DESCRIPTION OF THE DRAWINGS

An exemplary embodiment of this invention will now be described in more detail, by way of example, with reference to the accompanying drawings in which:

FIG. 5 is a table of example test data used in an example of the process illustrated in FIG. 4;

DETAILED DESCRIPTION OF EXEMPLARY EMBODIMENTS

Figure 1:
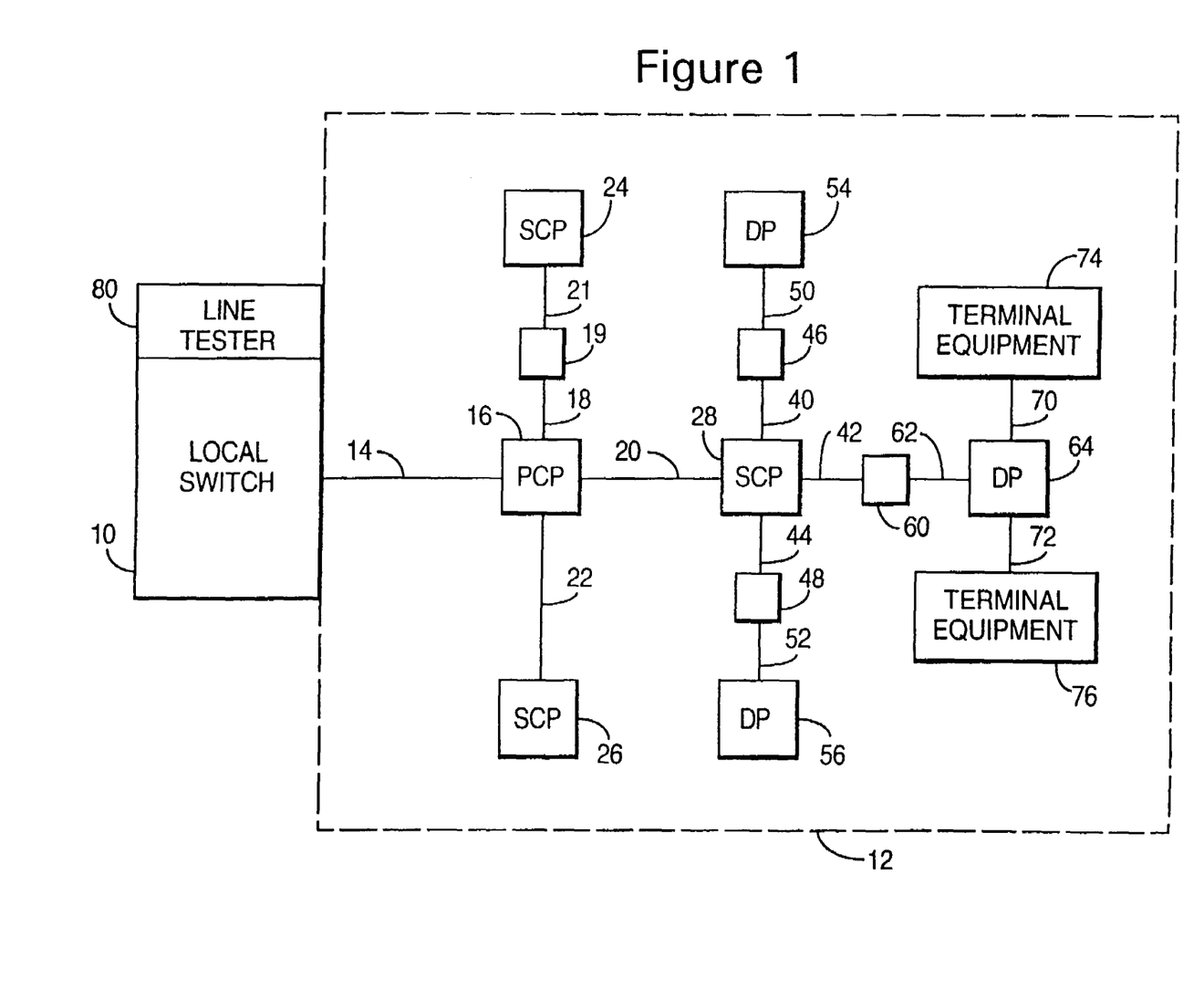
FIG. 1 is a block diagram of an access network and an associated local switch which form part of a communications network in which an exemplary embodiment of the present invention may be used.

Referring now to FIG. 1, there is shown a local switch 10 and a conventional access network 12 connected to the local switch 10. The local switch 10 and the access network 12 form part of a communications network. The local switch 10 is connected to the terminating circuits or lines of the access network 12. Typically, a local switch is connected to several thousand terminating circuits. Each terminating circuit or line passes through several nodes before reaching its respective terminal equipment. These nodes comprise primary cross-connect points, secondary cross-connect points, distribution points (DPs) and junctions and examples of these nodes will be described below.

In the conventional access network 12 shown in FIG. 1, each terminating circuit or line is formed from a pair of copper wires. The copper wires leave the local switch 10 in the form of one or more cables. One of these cables is shown in FIG. 1 and indicated by reference numeral 14. The far end of cable 14 from switch 10 is connected to a primary cross-connect point 16 which may be housed in a street cabinet or underground junction box. From the primary cross-connect point 16, the terminating lines branch out as cables in several directions. For simplicity, in FIG. 1 there are shown only three cables 18, 20 and 22. The far end of cable 18 is connected to a joint 19. The joint 19 is connected by cable 21 to a secondary cross-connect point 24. The far ends of cables 20 and 22 are connected, respectively, to secondary cross-connect points 26 and 28. For reasons of simplicity, the continuations of the terminating lines beyond secondary cross-connect points 24 and 26 are not shown. The secondary cross-connect points 24, 26 and 28 are housed in junction boxes which may be located above or below ground.

From the secondary cross-connect point 28, the terminating lines branch out again in several directions in the form of cables. By way of illustration, FIG. 1 shows cables 40, 42, and 44 leaving the secondary cross-connect point 28. Cables 40 and 44 are connected, respectively, to joints 46 and 48. Joints 46 and 48 are connected, respectively, to cables 50 and 52, the far ends of which are connected to distribution points 54 and 56. The far end of cable 42 is connected to a joint 60. The joint 60 is connected by cable 62 to a distribution point 64. For reasons of simplicity, the terminating lines beyond distribution points 54 and 56 are not shown.

Distribution points are implemented as junctions boxes which are typically located on telephone poles. From each distribution point, the terminating lines branch out as single copper wire pairs to where terminal equipment provided for a user of the network is located. By way of illustration, FIG. 1 shows two single copper wire pairs 70, 72, leaving the distribution point 64. The far ends of copper wire pairs 70 and 72 are connected, respectively, to terminal equipment 74, 76. As is well known, terminal equipment may take various forms. For example, terminal equipment may be a telephone located in a telephone box, a telephone instrument located in a domestic house or an office, or a fax machine or a computer located in a customer's premises. In the example shown in FIG. 1, each of the joints 19, 46, 48 and 60 is used to connect two cables together. Joints may also be used to connect two or more smaller cables to a larger cable.

In each terminating line, the two wires of each pair are designated as the A wire and the B wire. At the local switch 10, in order to supply current to the line, a bias voltage of 50V is applied between the A wire and the B wire. As the bias voltage was applied in the early exchanges by using a battery, the bias voltage is still known as the battery voltage. In the terminal equipment, the A wire and B wire are connected by a capacitor, the presence of which may be detected when the terminal equipment is not in use.

The terminating lines in the access network 10 are prone to faults. The main causes of these faults are ingress of water and physical damage to the nodes through which the terminating lines pass between the local switch 10 and terminal equipment. There are five main faults which occur due to causes arising in the nodes. These faults are disconnection, short circuit, faulty battery voltage, earthing fault and low insulation resistance. A disconnection arises where a terminating line is interrupted between the local switch and the terminal equipment. A short circuit arises where the A wire and B wire of a line are connected together. A faulty battery voltage arises where the A wire or the B wire of a terminating line has a short circuit connection to the B wire of another line. An earthing fault arises when the A wire or B wire is connected to earth or the A wire of another line. Low insulation resistance arises where the resistance between the A wire and the B wire or between one of the wires and earth or between one of the wires and a wire of another line is below an acceptable value.

In order to detect faults in the terminating lines of the access network 12, the local switch 10 is provided with a line tester 80. The line tester 80 may be operated from the local switch 10 or, as will be explained in more detail below, from a remote location. The line tester 80 is capable of performing various tests, examples of which will be described below. Various models of line testers for local switches are available commercially. In the present example, the line tester 80 is either Teradyne and Vanderhoff test equipment. In some case both types of test equipments may be used. As well as producing resistance, capacitance and voltage measurement data for line these pieces of equipment also further data called termination statements such as "Bell Loop", "Master Jack Loop" and "Bridged". These termination statements are special line conditions which the equipment is arranged to detect.

Figure 2:
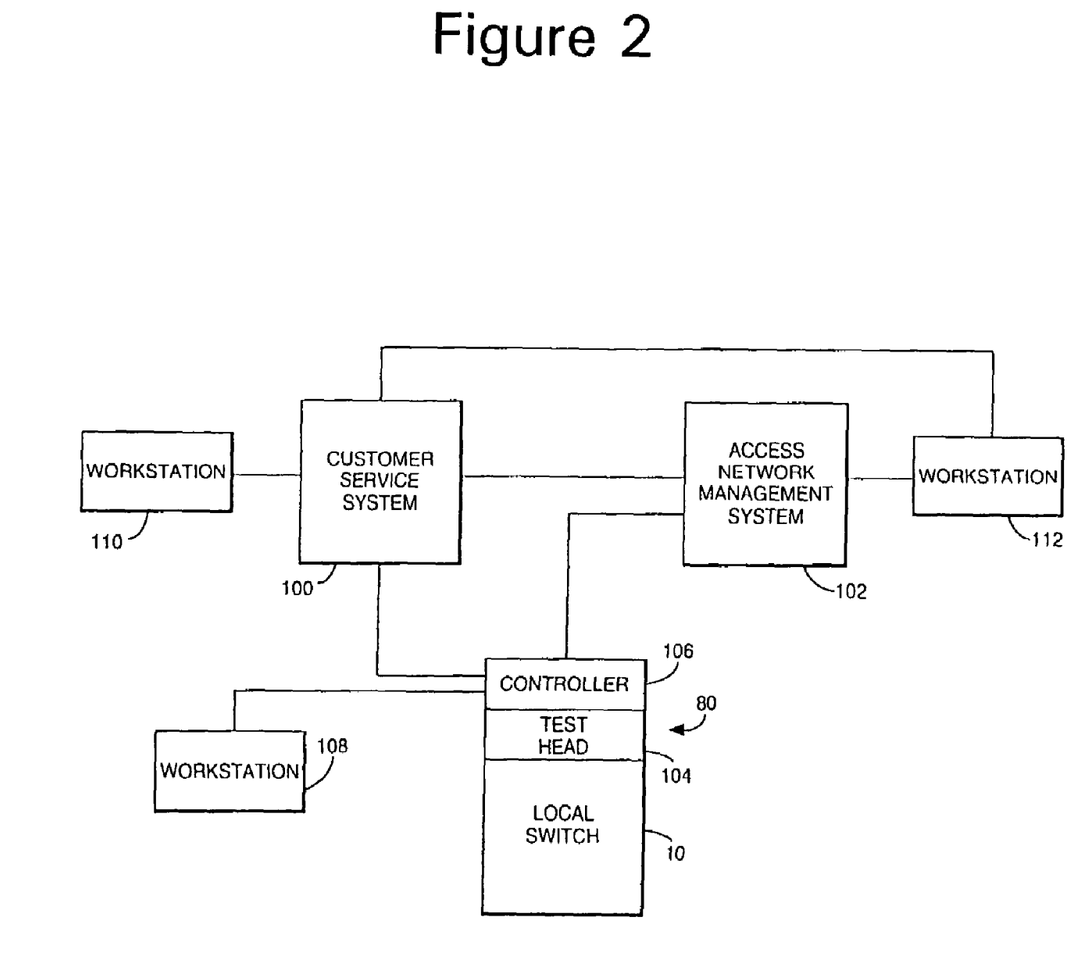
FIG. 2 is a block diagram showing the components of the communications network which are used to provide a fault management system in an example embodying the invention for the access network of FIG. 1.

Referring now to FIG. 2, there is shown the local switch 10 and the components of the communications network which provide a fault management system for the access, network 12. These components comprise the line tester 80, a customer service system 100 for the communications network and an access network management system 102. The line tester 80 comprises a test head 104 which contains the electronic equipment for physically making line tests and a controller 106 for the test head 104. The controller 106 takes the form of a computer. The controller 106 can be operated from a workstation 108 connected to it and provided at the local exchange 10. The controller 106 is also connected to both the customer service system 100 and the access network management system 102 and can be operated by workstations connected to either the customer service system 100 or the access network management system 102.

The customer service system 100 is also a computer and it can be operated from any one of a number of workstations which are connected to it. In FIG. 2, one such workstation is shown and indicated by reference numeral 110. The customer service system 100 is used by operators of the communications network who have contact with the customers of the network. Together with these operators, the customer service system is responsible for providing various services to the customers.

The access network management system 102 is also a computer and it can be operated from one of a number of workstations. One of these workstations is shown in FIG. 2 and indicated by reference numeral 112. The access network management system 102 is responsible for managing the access network 12 as well as a number of other access networks in the same general geographical area as the access network 12. The access network management system 102 manages various operations for each of the access networks which it manages. These operations include the provision of new equipment, logging data on work performed by engineers in the network, maintaining data on the terminating lines and nodes of each access network detection and management of faults. The workstations which are connected to the access network management system 102 are also connected to the customer service system 100. As shown in FIG. 2, the customer service system 100 and the access network management system 102 are connected together.

Although in the present example the fault management system for the access network 12 is formed from the line tester 80, the customer service system 100 and the access network management system 102, the fault management system could also be provided simply by the line tester 80 on its own. In order to achieve this, it would be necessary to add appropriate software to the computer which forms the controller 106. In a small network, this might be an appropriate form of providing the fault management system. However, in a large network it is advantageous to integrate the fault management system into the customer service system 100 and the access network management system 102.

The controller 106 is programmed to cause the test head 104 to make a series of routine tests each night on each terminating line of the access network 12. These tests will be explained with reference to the circuit diagram shown in FIG. 3.

Figure 3:
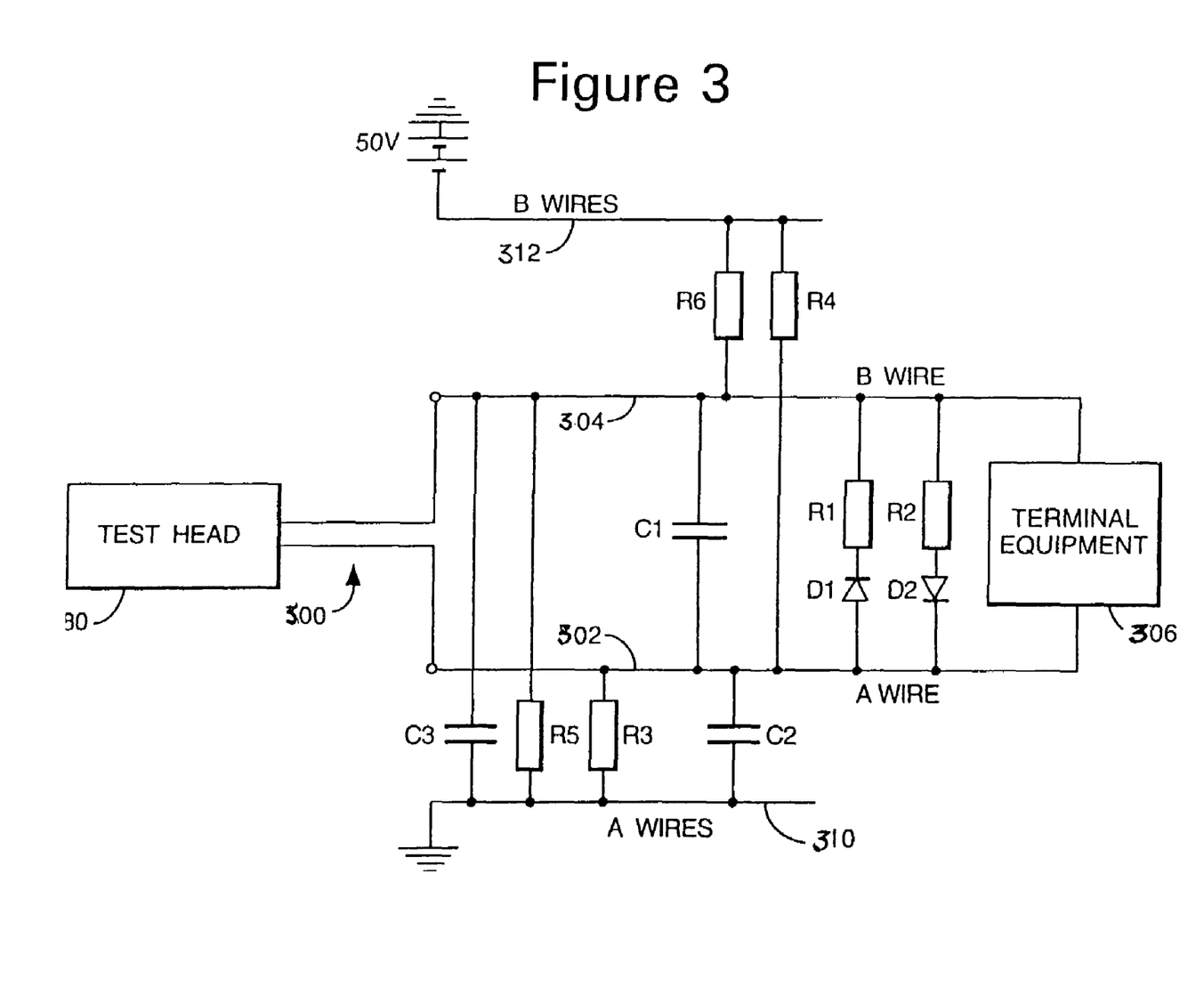
FIG. 3 is a circuit diagram illustrating some of the measurements which are made when testing a terminating circuit.

In order to test a line, may be disconnected from the switch 10 and connected to the test head 104. FIG. 3 shows a line 300 being tested. The line 300 has an A wire 302 and a B wire 304. The end of line 300 remote from switch 10 is connected to terminal equipment 306. Each of the lines 302, 304 has a resistance which depends upon its diameter and the distance from the local switch to the terminal equipment 306. Each of the wires 302, 304 is coated with an insulating material. The function of the insulating material is to provide insulation between each wire and adjacent wires. Damage to the insulating material or oxidation of the metal of a wire can cause the resistance between two adjacent wires to fall.

The effectiveness of the insulation between wires 302, 304 can be determined by measuring the resistance R1 between the A wire 302 and the B wire 304 and the resistance R2 between the B wire 304 and the A wire 302. The resistances R1 and R2 may be different because of rectification as indicated by diodes D1 and D2. For a circuit in good condition, the resistances R1 and R2 are high, greater than 1 megohm. Damage to the insulating material or oxidation will cause the resistances R1, R2 to fall by an amount which depends upon the severity of the damage or oxidation. If the insulating material is totally destroyed so that the A and B wires are physically touching each other, the values of resistances R1, R2 will depend upon the distance between the test head 80 and the point of damage but will typically lie in the range 0 to 1500 ohms. Oxidation can result in wires effectively touching each other.

Only the A and B wires 302, 304 of the line 300 being tested are disconnected. In the other lines, the bias voltage of 50 volts is applied between the A wire and the B wire. In FIG. 3, the A wires of the other lines are collectively shown by a wire 310 which is connected at the switch 10 to earth. The B wires of the other lines are collectively shown by a wire 312 connected at the switch to a potential of −50 volts.

If the insulating material separating the A wire 302 or the B wire 304 from one of the adjacent A or B wires becomes damaged, or if one of the wires suffers oxidation, current may flow. The effectiveness of the insulation between the A and B wires 302, 304 and adjacent A and B wires can be determined by measuring the resistance R3 between A wire 302 and adjacent A wires 310, the resistance R4 between the A wire 302 and adjacent B wires 312, the resistance R5 between the B wire 304 and adjacent A wires 310, and the resistance R6 between the B wires 304 and adjacent B wires 312.

For a good circuit, the resistance R3, R4, R5, R6 are high, greater than 1 megohm. Damage to insulating material may cause one or more of the resistances R3, R4, R5, R6 to fall by an amount which depends upon the severity of the damage. If the insulating material between the A wire 302 or the B wire 304 and an adjacent wire is totally destroyed so that the two wires are physically touching each other, the resistance between the two touching wires will depend upon the distance between the test head 80 and the point of damage but will typically lie in the range 0 to 1500 ohms. Oxidation can also result in two wires effectively touching each other.

The A and B wires 302, 304 and the insulating material between them act as a capacitor. In FIG. 3, the capacitance between the A and B wires is shown as having a value C1. The value of the capacitance between the A and B wires of a line will depend upon the length of the line. A break in the line 300 will reduce the value of capacitance C1 as measured from the test head 80. FIG. 3 also shows the capacitance C2 between the A wire 302 and earth and the capacitance C3 between the B wire 304 and earth.

Each night, the controller 106 causes the test head 80 to measure the resistances R1, R2, R3, R4, R5, R6 and the capacitances C1, C2, C3 for each terminating line of the access network 12. The controller 106 also causes the test head 80 to check if there is terminal equipment connected to the end of the line. Terminal equipment has a standard capacitance value. When terminal equipment is connected, the value of its capacitance is subtracted from the capacitance as measured by the test head to obtain the capacitance C1. For each terminating line, the results of the tests are stored against its directory number in the access network management system 102.

The controller 106 transmits the results of the tests to the access network management system 102. The access network management system 102 examines the results of the series of tests for each terminating line for the presence of a suspected fault. The possible faults include disconnection, short circuit, a fault battery voltage, an earth fault and low insulation resistance. When a fault is suspected, the name of the fault and the results of the test for the line are stored in the access network management system 102 against its directory number or an identifier in the exchange associated with the line. The details of the suspected faults found each night may be reviewed by an operator of the access network management system 102. Where appropriate, the operator may give instructions for a fault to be repaired.

The network management system 102 is also arranged to carry out some further processing of the data collected from the over-night testing. This further processing is designed to test potential faults rather than actual faults so that, where appropriate, remedial work can be carried out before the fault is detected by a customer. An overview of the processing carried out by the network management system 102 will now be given with respect to FIG. 4 and a detailed example of the processing will also be given below. The processing is initiated at step 401 either automatically in response to the receipt of the appropriate data or by a human operator and processing moves to step 403. At step 403, using known methods (which will be described in detail below), the test data for all the lines in question is analysed to identify lines with characteristics that indicate that a fault is likely to occur within a predetermined period of time i.e. an anticipated hard fault (AHF). The parameters for determining this are line resistance measurements and the thresholds are derived from historical data.

Figure 4:
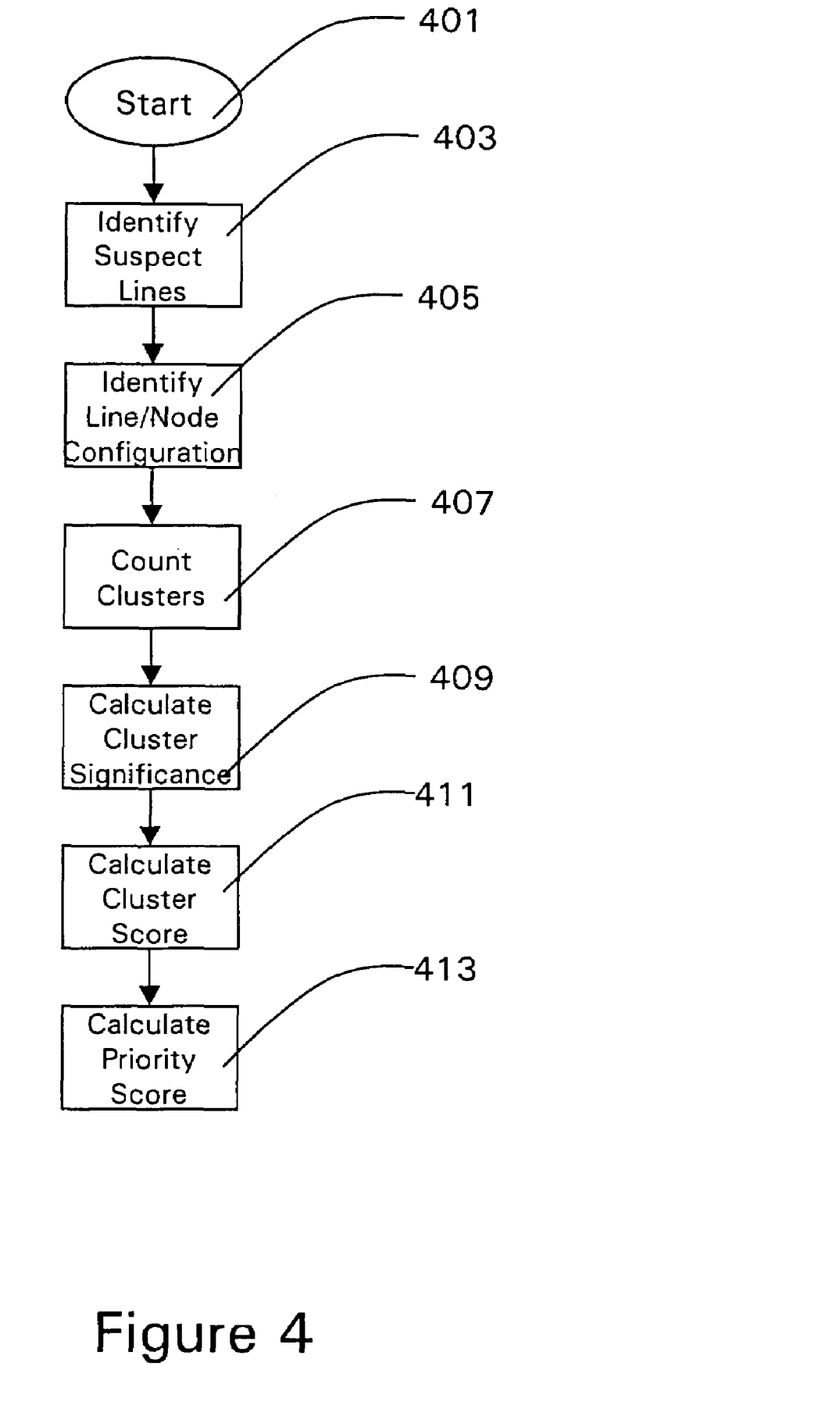
FIG. 4 is a flow diagram illustrating the processing performed in the fault management system in identifying faults in the network.

At step 405 records of line configurations i.e. the nodes in the network through which particular lines are connected are used to establish the pattern of anticipated hard faults for each node. The pattern is then analysed to identify and count clusters of faults in step 407. Then, at step 409, the clusters for a given node are analysed to verify that the correct number of clusters have been identified and that the clusters are statistically significant. At step 411, the clusters of anticipated hard faults in a given node are used to calculate a cluster node score. This score can then be used to rank the node against other nodes through which the same set of lines pass so as to enable the identification of the most likely node from which the faults are emanating. In other words, the cluster score can be used to locate the cause of the anticipated faults.

At step 413, further analysis of the anticipated hard faults is carried out and a priority score calculated for a given node. This priority score provides an indication of how soon a node is expected to become faulty and is used the establish which one of a set of nodes that carry the same set of lines is in most urgent need of attention. It should be noted that the cluster score and the priority score can be used independently or in combination. In other words, in carrying out preventative maintenance on a given node, the indication of the node most likely to be the source of the anticipated hard faults can be used independently or in combination with the indication of the node which is likely to become most faulty soonest.

The invention will now be described further by way of a worked example showing test data from a set of lines being processed in the manner outlined above with reference to FIG. 4. FIG. 5 shows the test data for each of twenty six lines running from an exchange. For each line the test data comprises four capacitance measurements between the A wire and earth, between the A wire and the B wire (both a current measurement and a prior measurement) and between the B wire and earth. The data also comprises a distance measurement for each line and a series of resistance measurements between each combination of the A wire, B wire, Battery and Earth. These correspond to the capacitances C1, C2, C3 and resistances R1, R2, R3, R4, R5, R6 described above with reference to FIG. 3. In addition, there is a previous capacitance reading between the A and B wires and a termination flag (Term) supplied by the Vanderhoff and/or Terradyne equipment. However, for the purposes of the present invention, only the resistance measurements between the A wire, the B wire and the Battery i.e. R4 and R6, are used.

From historical data a threshold limit is defined for the measurements R4 and R6 below which the line to which the measurements apply is treated as having an anticipated hard fault (AHF). An anticipated hard fault is defined as a line which is expected, on the basis of its R4 and R6 resistances, to become faulty (i.e. a hard fault) with a predetermined period. In the present embodiment the predefined period is one year and the limit for the resistance measurements is 400 kohms. This threshold may be determined by analysis of historical data for lines which have become faulty. Alternatively the threshold can be estimated and then adjusted while the system is in use.

Figure 6:
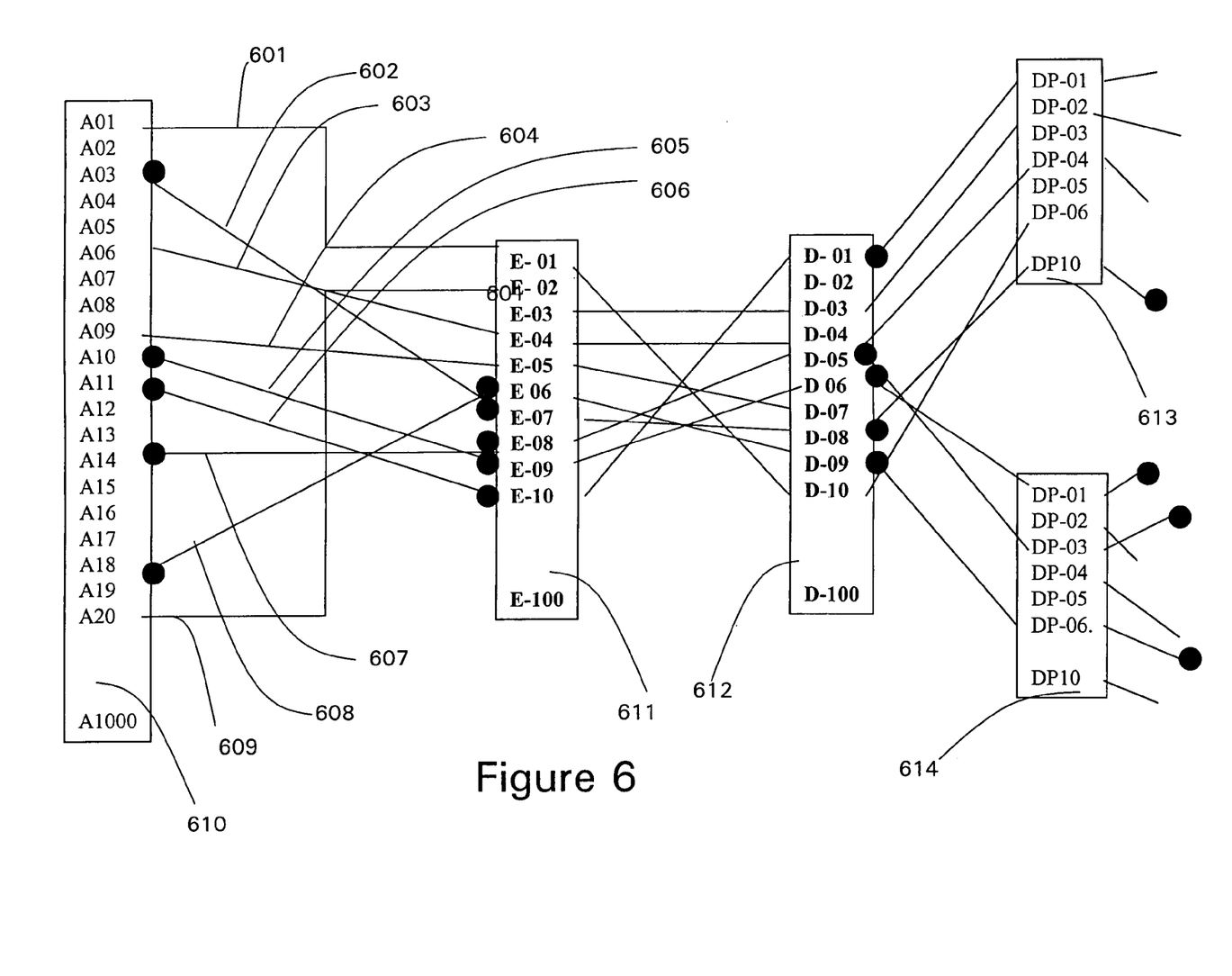
FIGS. 6 and 7 are schematic illustrations of a communications showing a plurality of network nodes interconnected by communications lines.

A noted above, FIG. 5 shows the test data for the lines emanating from an exchange. It can be seen that lines 4, 5, 9 to 12, 16 to 18, 20, 21, 23 and 24 all have resistance measurements between the A or B wire and battery of less than 400 kohms and as a result are classified as anticipated hard faults. FIG. 6 is a schematic representation showing nine of the twenty six lines 601 to 609 of FIG. 5 as they emanate from an exchange 610 to the exchange side of a primary connection point (PCP) cabinet 611, to the distribution side 612 of the PCP, to two distribution points (DPs) 613, 614 and on toward customer premises equipment (CPE) (not shown). Only nine of the twenty six lines are shown in FIG. 6 for the sake of clarity.

Each of the connection points on the exchange 610, the PCP 611, 612 and the DPs 613,614 is individually identified by a letter and number sequence as shown in FIG. 6. These connection identifiers enable the route that each line takes through the network nodes to the CPE to be recorded. Accordingly, each line 601-609 has a data record associated with it that is stored in the access network management system 102. The record for each line shows data such as the telephone number associated with the line and the connection identifiers for each line. For example, the connection identifiers for line two 602 in FIG. 6 would be A03, E07, D08 and DP10. These identifiers are also associated with a unique identification of the node in the network to which they apply so as to enable connection identifiers on two nodes of the same type to be told apart such as those on the two DPs 613, 614 shown in FIG. 6.

As will be understood by those skilled in the art, lines from an exchange to the CPE seldom follow an orderly path through the nodes of the network. In other words a line will not be connected to point A01 in the PCP, then E01, D01 and DP01 but instead will take an effectively random route across the connection points. In some cases, lines are deliberately mixed up so as to reduce the problems of cross-talk between the cables i.e. in an attempt to avoid two or more cables running along the same physical path. This mixing up is carried out for example in the connections between the E-side and the D-side of a PCP such as PCP 611, 612 in FIG. 6.

An anticipated hard fault (AHF) that is identified on a particular line may have occurred as a result of degradation of the line at any point along its length from the exchange to the CPE. Faults (including AHFs) very often occur at the points where the line is connected to a network node such as a PCP or DP. These are points at which the physical cable is more easily affected by corrosion, the breakdown of insulation or water ingress. In FIG. 6, the points at which the lines that are showing an AHF according to the test data of FIG. 5 are connected to network node are indicated with large black dots (○). As noted above, not all the lines emanating from the exchange 610 are shown but instead and nine example lines are shown.

As noted above, the first step 403 in the processing carried out by the network management system 102 is to identify the lines that show AHFs and this is carried out by the analysis of the data shown in FIG. 5. This analysis reveals AHFs on lines 2 and 5 to 8 in the present example. In the next step 405, the processing analyses each node or each one of a selection of nodes from the network. This analysis will now be explained further with reference to an example of 28 cables from a frame of a network node (the node could be an exchange, a PCP or a DP). The frame is represented in table 1 below by a sequence of nominal connection identifiers 1 to 26:

TABLE 1

| 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 |
|---|---|---|---|---|---|---|---|---|---|---|---|---|---|---|---|---|---|---|---|---|---|---|---|---|---|
| a | a | a | b | b | a | a | a | b | b | b | b | a | a | a | b | b | b | a | b | b | a | b | b | a | a |

The second line of table 1 above determines whether or not the line attached at the relevant connection point is exhibiting an AHF. An "a" designates a fault free line while a "b" designates a line exhibiting an AHF. The next step in the processing to establish the number of clusters of AHFs that are present for the frame. Firstly the range over which AHF clusters occur is established. In the example of table 1 above the clusters start at line 4 and extend to line 24. Therefore the cluster range is 4 to 24 and of these lines 13 are showing AHFs (i.e. are suspect).

The next step 405 in the processing determines whether any of the lines which are not shown as AHF that are between groups of suspect lines are, in fact, misdiagnosed and should be treated as "b"s or AHFs. The basis for this element for the processing is that lines or cables that are situated in close proximity tend to share fault characteristics since the cause of the fault in one line, for example water dripping down the frame of the network node, is not in practice isolated to that single line or cable. The Cluster Range i.e. the number or distance between two suspects ("b"s) that determines whether or not the two suspect are part of the same cluster or are separate clusters is determined in accordance with the following formula:

Cluster Range=(No. in Group/No. of Suspect)$^p$ (where "p" is the range parameter which in the present embodiment is set to 0.5)

The formula refers to a group which is a subset of the data from table 1 selected from the first line exhibiting an AHF to the last line to do so. In table 1 above, the group will run from position four to position 24. The formula takes the total number of suspect in the group being analysed, divides it by the total number of suspects in the group and multiplies this to the power of the range parameter p. Therefore in the present example, the cluster range is calculated as (24/13)$^{0.5}$=1.84. The cluster range is then used to determine which of the apparently fault free lines ("a"s in table 1 above) that are physically located between lines that show AHFs should be treated as showing an AHF. In other words, if there is only one "a" between two (or more) "b"s then the "a" is treated as a "b" and part of the cluster with its adjacent "b"s i.e. 1<cluster range=1.84. If there were two "a"s then these would not be treated as forming a cluster with the adjacent "b"s i.e. 2>cluster range=1.84. Applying the cluster range to the results shown in table 1 has the following results illustrated in table 2 below.

TABLE 2

| Cluster Type | Position on Frame | Cluster ID Number (B) | Cluster ID Number (A) | Below Cluster Range? |
|---|---|---|---|---|
| B | 4-5 | 1 | | |
| A | 6-8 | | 2 | N |
| B | 9-12 | 3 | | |
| A | 13-15 | | 4 | N |
| B | 16-18 | 5 | | |
| A | 19 | 5 | | Y |
| B | 20-21 | 5 | | |
| A | 22 | 5 | | Y |
| B | 23-24 | 5 | | |
| Total B Clusters | | 3 | | |
| Total A Clusters | | 2 | | |

The result of the application of the cluster range to the data from table 1 can be seen in the fifth column of table 2. This shows that the "a"s at positions 19 and 22 of table 1 have been treated as "b"s resulting in the data from positions 16 to 24 being treated as a single cluster of AHFs. Conversely, the "a"s at positions 6 to 8 and 13 to 15 are treated as legitimately indicated as fault free i.e. not part of their adjacent fault clusters.

Accordingly, the information recovered from the analysis of the data of table 1 is as set out below in table 3.

TABLE 3

| Number of Suspects (AHF) | 13 | NS |
| Number of Clusters (A & B) | 5 | NC |
| Number in Group (24-4) + 1 | 21 | |
| Number of None Suspect 21-13 | 8 | NO |

The total number of lines identified as suspect is thirteen and make up a total of five clusters. The total number of lines in the group is 21 i.e. excluding from the data in table 1 the non-faulty lines at the beginning and end of the sequence. The total of non-suspect lines within the group is eight. In determining the data in table 3 above, the lines at positions 19 and 22 are treated as "b"s for the cluster score calculation but as "a"s for the remaining calculations.

The next stage 409 in the processing is to determine whether the clustering that has been identified is coincidental or more likely to result from a single cause. Essentially the test is one of randomness. If the cluster pattern is random then it is treated as coincidental while if it is not random it is treated as resulting from a single cause. This is determined by calculating a cluster value as follow:

$$\text{Cluster Value} = \text{ABS}\left(\frac{NC - \text{Mean}}{SD}\right)$$

Where NC is found in table 3 above, SD is the standard deviation set out below along with the formula for the Mean.

$$\text{Mean} = \left(\frac{2 \times NS \times NO}{NS + NO}\right) + 1$$

-continued $$SD = \sqrt{\frac{2 \times NS \times NO(2 \times NS \times NO - NO - NS)}{(NO + NS)^2 \times (NO + NS - 1)}}$$

These equations make up a test called the Mann Whitney U Test which is a test for randomness. Taking the data recovered and shown in table 3 above, the following calculations are made by the processing in step 409:

$$\text{Mean} = \left(\frac{2 \times 13 \times 8}{13 + 8}\right) + 1 = 10.904$$

$$SD = \sqrt{\frac{2 \times 13 \times 8(2 \times 13 \times 8 - 8 - 13)}{(8 + 13)^2 \times (8 + 13 - 1)}} = 2.099$$

$$\text{Cluster Value} = \text{ABS}\left(\frac{5 - 10.904}{2.099}\right) = 2.853$$

The cluster value is then compared to a threshold value called the cluster parameter. If the cluster value is above the threshold the cluster in question is treated as a valid cluster. If the cluster value is below the threshold then it is not treated as a cluster. In the present embodiment, the cluster parameter is set at 1.96 which is the point at which there is a 95% chance of the pattern of AHFs being non-random according to a normal distribution. The cluster parameter can be adjusted while the system is in use. It can be seen that in the present example, the cluster value of 2.853 is greater that the cluster parameter thus indicating that the data from table 1 being analysed represents a true (i.e. non-random) cluster.

The next step 411 in the processing of the is to calculate the priority score for the node being analysed. This score takes in to account a number of different factors of historical data relating to the node being analysed as well as the cluster value established in the previous steps to calculate a priority score for the node. The data used by this step in the analysis is, in the present embodiment, stored by the network management system 102 for each node and comprises the number of lines that are not being used i.e. the number of spare pairs, the number of suspect lines (or pairs), the number of working lines, the number of faulty lines, a previously retained percentage increase in faulty lines. The following formulae is then used to calculate the priority score for the node.

$$PriorityScore = \left(1 - \left(\frac{S - (Sus + F)}{One(S)}\right) \times \left(\frac{Sus \times 100}{One(W)}\right)\right) + (I \times P1) + (C \times P2)$$

where:
S=spare lines;
Sus=suspect lines;
W=working lines;
F=faulty lines;
C=cluster value;
I=percentage increase in faulty lines; and
$I^P$=previous percentage increase in faulty lines.

The percentage increase in faulty lines I is calculated in accordance with the following formulae:

$$I = \left(\frac{F}{F + S + W}\right) - I^P$$

if I<1 then

There are two further factors P1 and P2 which affect the priority score. These are weighting factors which can be used to adjust the performance of the priority algorithm. The first weighting factor P1 is termed the Fault Increase Weighting Factor and in this embodiment is set to a value of 100. I is a measure of the rate of fault increase and P1 governs the effect that I has on the priority score. The second weighting factor P2 is termed the Grouping Algorithm Weighting Factor and in this embodiment is set to a value of 10. P2 governs the effect that the cluster value C has on the priority score. The priority score algorithm also makes use of a function called "One" which converts values of "0" to "1".

The calculation of the priority score will now be explained further with reference to an example of the E-side of a PCP that has 87 lines (or pairs) running in to in, 10 are spare lines, 13 are suspect (AHFs), 65 are working (i.e. not faulty or AHFs) and 12 are known to be faulty. The suspects in this example of 87 lines are clustered in the same pattern as show in table 1 above. The cluster value calculation is independent of the number of lines and instead only takes in to account the lines in the suspect group. As a result, the cluster value for the present example of 87 lines will be the same as that calculated above with reference to the data of table 1 i.e. 2.853. In this example the previous percentage increase in faulty pairs is 12.6%.

Accordingly, in step 411, I is calculated as follows:

$$I = \left(\frac{12}{12 + 10 + 65}\right) - 0.126 = 0.137 - 0.126 = 0.011$$

Thus the priority score for the node is calculated as follows:

$$PriorityScore = \left(1 - \left(\frac{10 - (13 + 12)}{One(10)}\right) \times \left(\frac{13 \times 100}{One(65)}\right)\right) + (0.011 \times 100) + (2.853 \times 10)$$
$$= (1 - (-1950/650)) + 1.10 + 28.53$$
$$= 4.00 + 1.10 + 28.53$$
$$= 33.63$$

Figure 7:
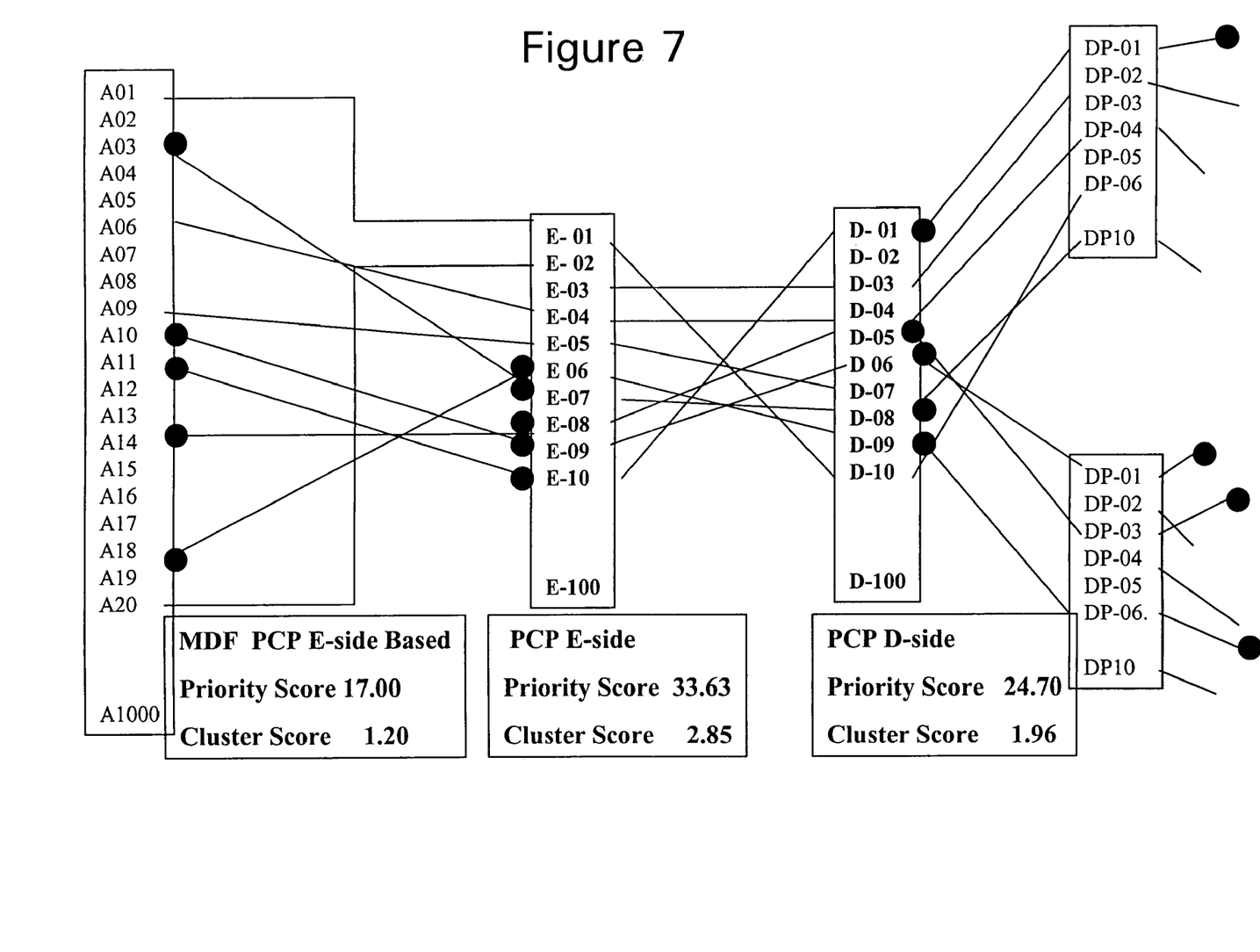

As noted above, the priority score is calculated for a number of nodes in the network and can then be used to determine how work such as preventative maintenance should be prioritised. The higher the priority score, then the more urgent the maintenance. FIG. 7 shows the same set of network nodes as are described above with reference to FIG. 6 but with the addition of the priority scores and cluster scores for each node. Again, only nine of the 87 lines running from the exchange are illustrated for the sake of clarity.

The node with the highest cluster score and the highest priority score is the E-side of the PCP 611. This indicates to the network manager that, because there is a cluster of faults in that node, it is likely to be the source of the anticipated faults that have been detected on the lines that run through the set of nodes that have been analysed. Often, as mentioned above, such clustered AHFs are caused by the same problem such as water leaking in to the cabinet that holds the network node and causing corrosion and/or short circuits. The priority score gives the network manager a further indication of how the maintenance of the network of FIG. 7 should be planned as it gives a relative measure of the urgency of the preventative maintenance for a given node. In other words it gives an indication of how soon hard faults are going to appear and how many.

In the example shown in FIG. 7, the highest priority score and the highest cluster score both occur for the same node. Although this will not be an unusual situation in practice, situations are also possible where the highest of each of the scores occur for different nodes. In this case, the judgement of the network manager would be needed to decide between carrying out maintenance on the highest priority node or the node with the greatest cluster score (or perhaps both). It will also be clear to those skilled in the art that the cluster score system and the priority score system can be used either together as noted above or independently of each other. Furthermore, although the cluster value is used in the calculation of the priority score for a node, it will be clear to those skilled in the art that this is not essential and that a priority score, for use in the same manner as described above can still be calculated without taking in to account a cluster value.

The results of the processing of the data of table 1 to produce the cluster and priority scores for each node in the network can be presented to the user of the network management system 102 in a number of ways. For example, the results can be presented in tabular form with columns showing the scores for each node. Alternatively, the results can be displayed pictorially as shown in FIG. 7 with the scores being presented in boxes near a representation of the network node to which they relate. This can be supplemented by indications such as the black dots (o) where lines exhibiting AHFs are attached to the network nodes so as to give a visual indication of the clustering in addition to the cluster score.

Although the present invention has been described with reference to an access network in which each circuit is carried by a piece of copper wire, it may also be used for terminating circuits carried by optical fibres.

It will be understood by those skilled in the art that the apparatus that embodies the invention could be a general purpose computer having software arranged to provide the analysis and/or processing of the test data. The computer could be a single computer or a group of computers and the software could be a single program or a set of programs. Furthermore, any or all of the software used to implement the invention can be contained on various transmission and/or storage mediums such as a floppy disc, CD-ROM, or magnetic tape so that the program can be loaded onto one or more general purpose computers or could be downloaded over a computer network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A method of operating a fault management system for a communications network comprising a plurality of lines passing through a plurality of nodes, said method comprising:
    performing a test on a plurality of said lines to obtain one or more elements of test data for each line;
    analyzing the test data to identify lines with common fault characteristics;
    establishing a score for each node based on a count of lines with common fault characteristics, which score provides a relative measure of urgency of maintenance tasks required to remove effects of line fault characteristics from the node; and
    establishing a score for each node based on a relative measure of physical clustering of lines with common fault characteristics for each node so as to give an indication of the node at which the cause of a common fault characteristic is most likely to be located.

2. A method as in claim 1 in which, the scores for each node are calculated using numbers of: spare lines, working lines, suspected faulty lines and actual faulty lines.

3. A method as in claim 1 in which the score based on clustering is used in calculation of a priority score.

4. A method as in claim 3 in which calculation of the priority score depends on a percentage increase in faulty lines for the node.

5. A tangible computer program storage medium containing a computer program or set of computer programs arranged to cause a general purpose computer or group of such computers to carry out the method of claim 1.

6. A fault management system for a communications network, the network comprising a plurality of lines passing through a plurality of nodes, said system comprising:
    means operable to perform a test on a plurality of said lines to obtain one or more elements of test data for each line;
    means operable to analyze the test data to identify lines with common fault characteristics;
    means operable to establish a score for each node based on a count of lines with common fault characteristics, which score provides a relative measure of urgency of maintenance tasks required to remove effects of line fault characteristics from the node; and
    means for establishing a score for each node based on a relative measure of physical clustering of lines with common fault characteristics for each node so as to give an indication of the node at which the cause of a common fault characteristic is most likely to be located.

7. Apparatus as in claim 6 in which, the scores for each node are calculated using numbers of: spare lines, working lines, suspected faulty lines and actual faulty lines.

8. Apparatus as in claim 6 further comprising means for using the score based on clustering in calculation of a priority score.

9. Apparatus as in claim 8 in which calculation of the priority score depends on a percentage increase in faulty lines for the node.

10. A tangible computer program storage medium containing a computer program or set of computer programs arranged to cause a general purpose computer or group of such computers to provide the system of claim 6.

* * * * *